(No Model.) 4 Sheets—Sheet 1.

S. C. PALMER.
MACHINE FOR HARDENING HATS.

No. 382,379. Patented May 8, 1888.

Witnesses
S. S. Williamson
J. A. Lowden

Inventor
Seymour C. Palmer
by Smith and Hubbard
Attorneys (No Model.) 4 Sheets—Sheet 2.
S. C. PALMER.
MACHINE FOR HARDENING HATS.

No. 382,379. Patented May 8, 1888.

(No Model.) 4 Sheets—Sheet 3.
S. C. PALMER.
MACHINE FOR HARDENING HATS.
No. 382,379. Patented May 8, 1888.
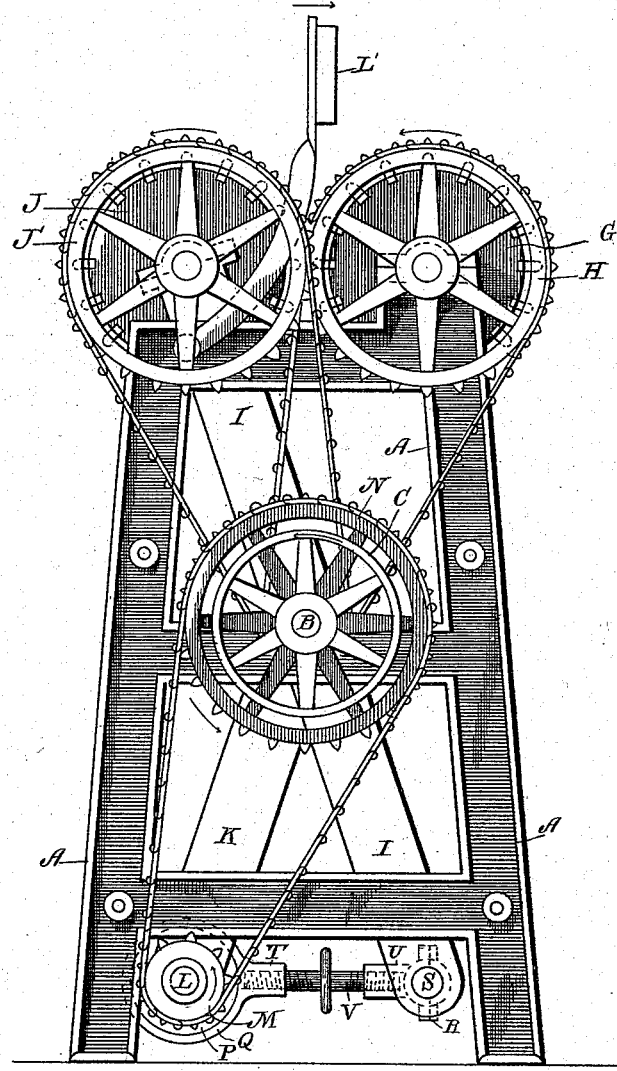

(No Model.) 4 Sheets—Sheet 4.

S. C. PALMER.
MACHINE FOR HARDENING HATS.

No. 382,379. Patented May 8, 1888.

Witnesses
S. S. Williamson
J. A. Lowden

Inventor
Seymour C. Palmer
by Smith and Hubbard
Attorneys

UNITED STATES PATENT OFFICE.

SEYMOUR C. PALMER, OF SOUTH NORWALK, CONNECTICUT, ASSIGNOR TO ELLEN M. PALMER, OF SAME PLACE.

MACHINE FOR HARDENING HATS.

SPECIFICATION forming part of Letters Patent No. 382,379, dated May 8, 1888.

Application filed June 15, 1887. Serial No. 241,333. (No model.)

*To all whom it may concern:*

Be it known that I, SEYMOUR C. PALMER, a citizen of the United States, residing at South Norwalk, in the county of Fairfield and State of Connecticut, have invented certain new and useful Improvements in Machines for Hardening Hats; and I do hereby declare the following to be a full, clear, and exact description of the invention, such as will enable others skilled in the art to which it appertains to make and use the same.

My invention has reference to machines for hardening hats, and has for its object to automatically harden a hat-roll throughout a predetermined period of time; and with these ends in view my invention consists in certain details of construction and combinations of elements, hereinafter fully set forth, and then specifically designated by the claims.

My invention will be best understood by one skilled in the art upon reference to the accompanying drawings, which form a part of this specification, and in which—

Figure 1:
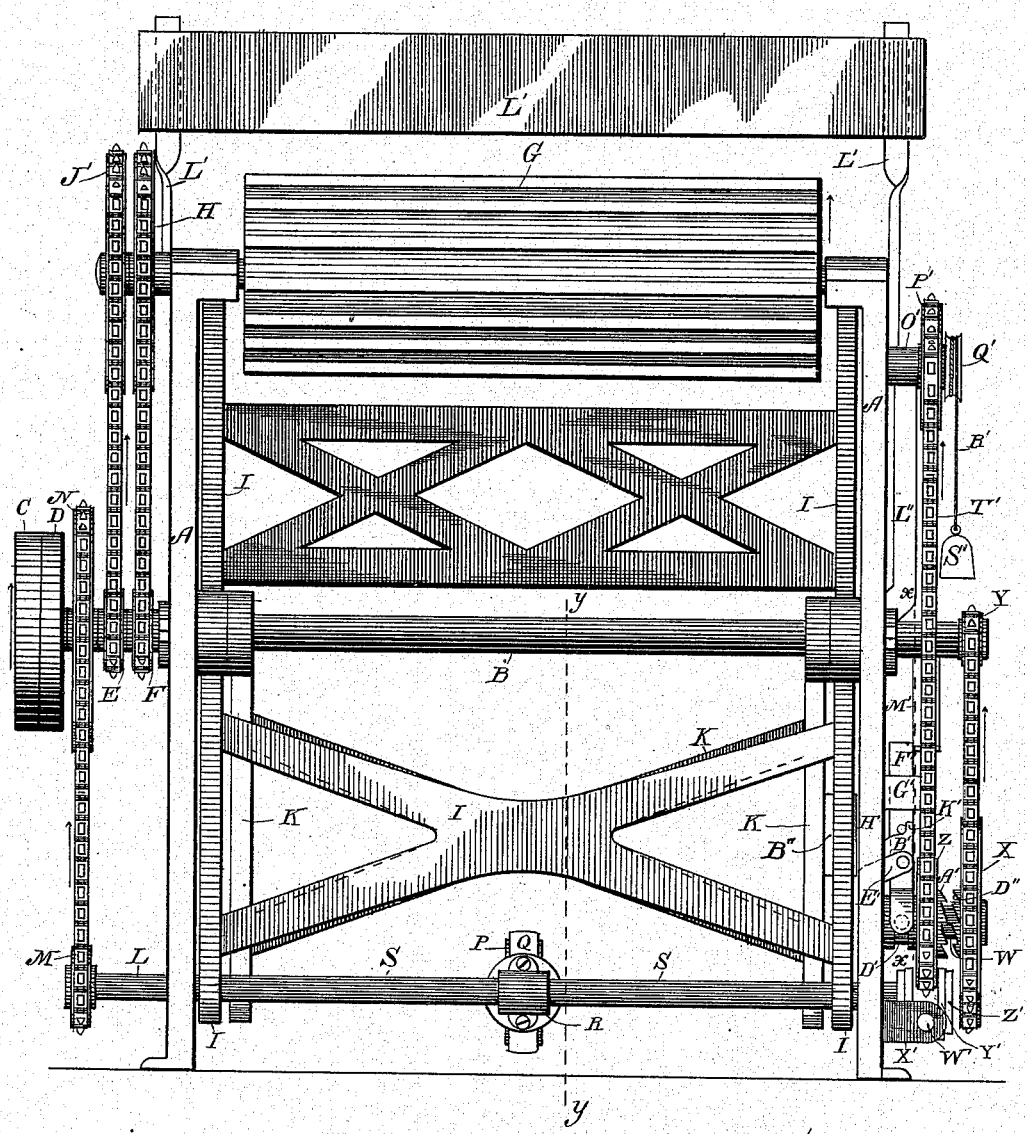
Figure 2:
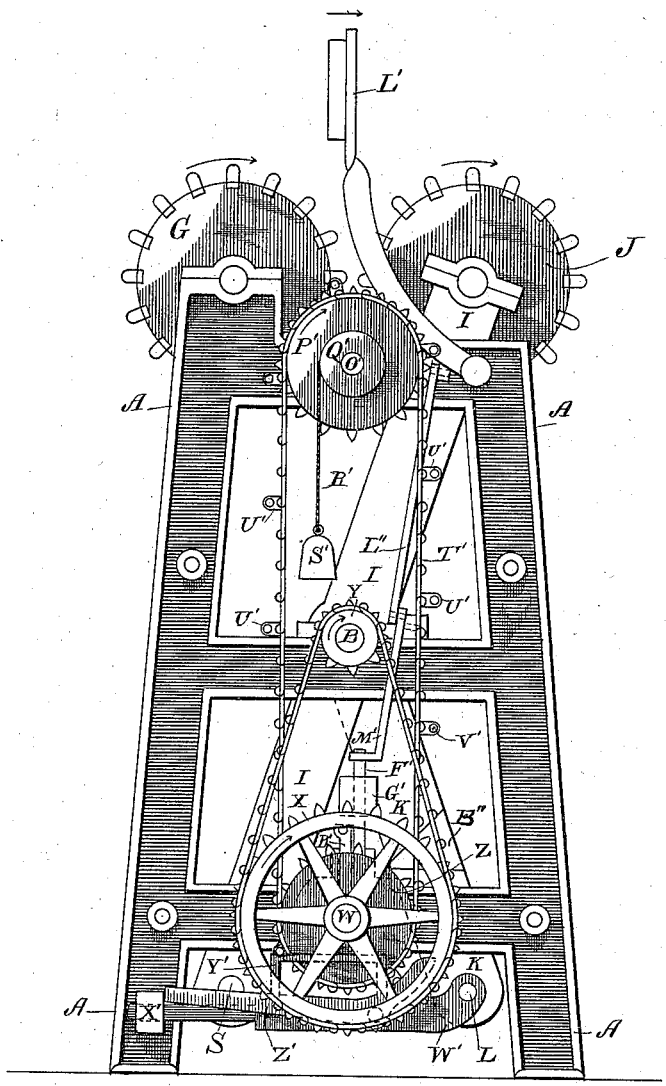
Figure 7:
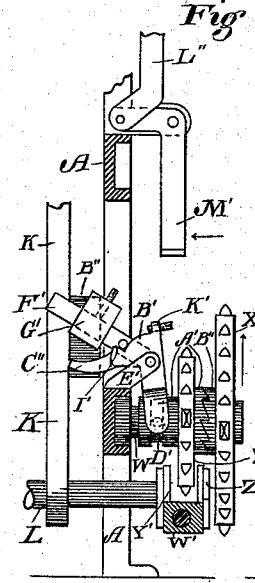
Figure 4:
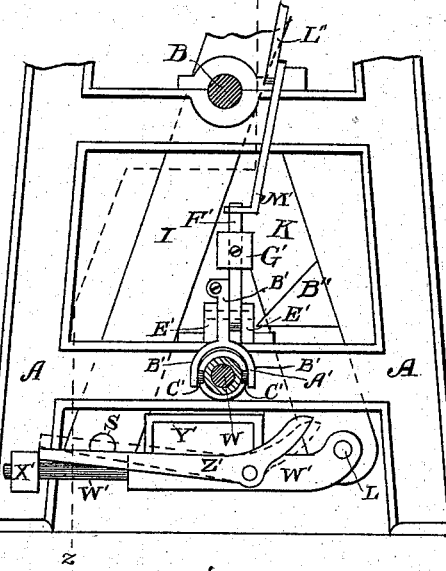
Figure 5:
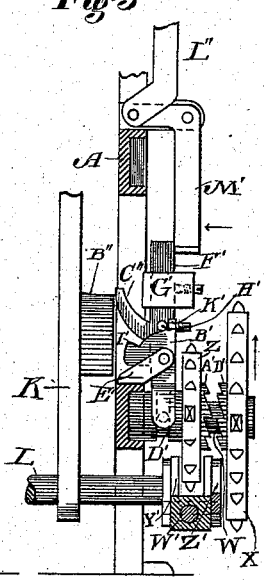
Figure 6:
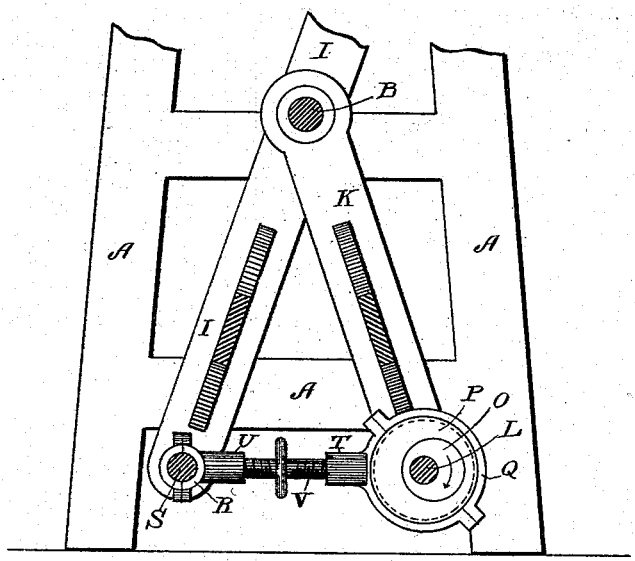
Figure 8:
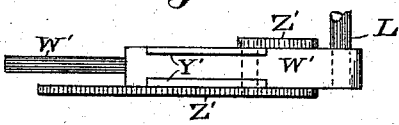

Figure 1 is a front elevation; Figs. 2 and 3, elevations of opposite sides; Figs. 4 and 6, sections at the lines $x\,x$ and $y\,y$, respectively, of Fig. 1, the upper half of the machine being broken away; Fig. 5, a section at the line $z\,z$ of Fig. 4; Fig. 7, a view similar to Fig. 5, but showing the position of the several parts after the clutch-lever has been operated; and Fig. 8, a detail plan of the trip and lock levers.

Similar letters denote like parts in the several figures of the drawings.

A is the frame of the machine, through which runs a shaft, B, journaled in suitable bearings.

C D are loose and tight pulleys, respectively, on said shaft.

E F are sprocket-wheels mounted on this shaft, and by means of which motion is communicated to the rolls, as will be presently explained.

G is the stationary roll, journaled in bearings at the top of the frame. Secured on one of the trunnions of this roll is a sprocket-wheel, H, which is belted to the sprocket F by an ordinary sprocket-chain.

I is a swinging frame mounted upon the shaft B and having suitable bearings at the top, within which is journaled the movable roll J. One of the trunnions of this roll J carries a sprocket-wheel, J', belted to the wheel E by a sprocket-chain.

K is a jog-frame mounted at its upper extremity on the shaft B and having extending through its lower end a shaft, L, on which latter is a sprocket-wheel, M, which is belted up by a sprocket-chain to the sprocket-wheel N, mounted on the shaft B.

On the shaft L, about midway thereof, is secured an ordinary compound eccentric consisting of the fixed cam O and the adjustable cam P, the operation of such eccentric being ordinary and well known.

Q is a strap secured around the adjustable cam P, and R is also a strap, secured around a rod, S, which latter is secured within and extends between the sides of the frame I at the lower end thereof. These straps Q R have threaded sockets T U, respectively, within which runs a right-and-left-handed adjusting-bolt, V, by the operation of which the frames I K are caused to approach toward and retreat from each other, as the case may be, all of which will be presently set forth.

The mechanism and parts already set forth constitute and form a machine complete, which is capable of hardening a hat, since if a hat-roll be placed between the rolls and motion be applied to the primary shaft the said rolls will revolve in the direction indicated by the arrows in Figs. 2 and 3, while at the same time the compound eccentric on the shaft L will operate to effect a slight reciprocating swinging movement to the movable roll through the medium of the swinging frame, thereby revolving the hat-roll and causing a variable and intermittent pressure against the same.

I will now proceed to describe certain automatic means whereby the hat-roll is operated upon for a predetermined period of time.

W is a short shaft projecting from the side of the frame, and X is a sprocket-wheel whose hub D" is rigidly mounted at the end of this shaft and belted by chain to the sprocket Y at the extremity of the shaft B.

Z is a sprocket-wheel whose hub A' is loosely mounted upon the shaft W, so as to have a free longitudinal play.

B' is a yoke having pallets C', which embrace said hub within a groove, D', therein.

This yoke is pivoted between brackets E', projecting from the frame, between which latter is also pivoted a striker, F'. Adjustably secured at the upper portion of this striker is a weight, G', and projecting from the side of said striker is a pin, H', adapted to abut against shoulders I' K' on the yoke B', as will be presently set forth.

The hubs of the sprockets X Z have crown-ratchets whose teeth are inclined in opposite directions and are adapted to engage and become interlocked when the hub A' is moved outward.

L' is the clutch-operating lever, pivoted to the frame A and connected by a link, L'', to the short arm of an L-shaped lever, M', which latter is pivoted to a lug, N', projecting from the frame of the machine. The lower or long arm of this lever M' extends below the top of the striker F when the latter is in a vertical position and is in contact therewith, as shown at Fig. 5, so that it will be readily understood that any movement of the clutch-operating lever in the direction indicated by the arrow will cause the striker F' to be thrown to one side, so that its center of gravity will fall beyond the vertical plane of its pivotal point and the pin H' will strike the shoulder I', thereby forcing the hub A' outward, so that the latter will interlock with the hub of the sprocket-wheel X.

Projecting from the upper part of the frame A is a short shaft, O', on the extremity of which is mounted a sprocket-wheel, P', to the outer face of which latter is secured a drum, Q', having a rope, R', around it, to the free end of which rope is attached a weight, S'. The sprocket-wheels Z P' are belted together by a chain, T', and it is therefore obvious that when the hubs of the sprockets X Z are interlocked, as above set forth, the wheel P' will revolve in the direction indicated by the arrow at Figs. 1 and 2, and thereby wind the rope around the drum. When the hubs of the sprockets X Z are disengaged, the weight will drop by gravity, and thereby revolve the wheels Z P' in the reverse direction.

Secured to the chain T' at regular intervals are ears U', which are pierced for the insertion of a trip-pin, V', the function of which will be presently explained. Pivoted on the shaft L, at the side of the machine, is a lever, W', supported at its free end in a loose bearing, X', projecting from the frame A, so as to have a free longitudinal play therein.

Y' is a stop extending upward from the lever W' in close proximity to the chain T', and Z' is a trip-bar pivoted to the side of said lever. The upper rear edge of this bar is inclined downward toward the stop and is within the field of travel of the trip-pin V', while the front end thereof is adapted to drop by gravity behind the bearing X', and thereby lock the jog-frame in its extended and operative position. From the foregoing it will be seen that when the chain T' is carried by the sprockets Z P' during the winding of the rope R' the pin V' will impinge against the trip-bar Z' along the inclined edge thereof, and thereby, raising the forward end from behind the bearing X', will strike the step Y' and throw the lever W' forward.

Now, since, as has been hereinbefore explained, the frames I K are connected by the bolt V, the forward movement of the lever W' will simultaneously operate the frame I and thereby cause the roll J to swing away from the roll G, thus permitting the hat-roll to drop on any convenient table, whence it may be readily removed. In order that the several parts of my improvement may be automatically returned to their normal position for operation on a subsequent hat-roll, I provide means for accomplishing this result, as follows: From one side of the frame K projects a lug, B'', inclined on its face from the top to the bottom, and from the striker F' an arm, C'', extends toward this lug. When the striker has been thrown down by the lever M', as shown at Fig. 7, the arm C'' extends across the operative field of the lug B'' and at the base of the incline thereof. Therefore, when the frame K is carried forward by the abutment of the pin V' against the stop Y', as before explained, the said lug will strike the arm C'' and elevate the same, so that the striker F' will assume its vertical or normal position, while at the same time the pin H' will abut against the shoulder K' and swing the yoke B' to its upright or normal position, thereby withdrawing the hub A' from engagement with the hub D''. A stop-pin, A'', is attached to the chain T' within one of the ears U', and is adapted to strike the yoke Y' on the reverse movement of said chain, so that it will be readily understood that as soon as the hubs of the sprockets X Z become disengaged the weight S' will drop by gravity until the pin A'' strikes the yoke, thereby restoring the pin V' to its normal position and allowing the frame I also to swing by gravity, so as to bring the roll J into operative position.

In order to facilitate the return movement of the frame I, the latter is made heavier at the bottom, so as to overbalance the weight of the roll J at the top of the frame. Therefore, it will be readily understood that when the pin V' has been withdrawn from abutment with the yoke Y' by the falling of the weight S' the frame I will swing back to its normal position and become locked therein by the dropping of the trip-bar Z'.

The operation of my improvement will, in view of the foregoing description, be obviously as follows: The operator stands facing the stationary roll and drops the roll of hats to be hardened between the rolls G J, at the same time pushing against the clutch-operating lever L', which latter throws the automatic tripping mechanism into engagement with the motive power, as has been heretofore explained. The rolls continue to revolve against the hat-roll until the trip carried by the chain T' strikes the trip bar Z', and, unlatching the same, abuts against the yoke Y' and throws the lower end of the frame I forward, when the roll J, carried by said frame, will of course be thrown back and allow the hat-roll to drop between the rolls. As the jog-frame K swings simultaneously with the frame I, the inclined lug B'' will raise the striker F' to its vertical or normal position, thereby disengaging the trip-operating mechanism from the motive power and allowing the weight S' to fall and by its weight restore the trip-pin V' to its normal position. The duration of the hardening of the hat-roll is of course dependent on the time which ensues before the trip-pin strikes the yoke Y', and therefore different degrees of hardening may be accomplished by locating this trip-pin in the various ears U', which extend at intervals from the chain T', the length of the rope R and the size of the drum Q' being of course adapted to the travel of the chain T'.

I have shown and described a preferred way of imparting motion to the rolls by means of sprocket-wheels and chains; but I do not wish to be understood as claiming this as a feature of my invention; nor do I wish to be circumscribed by the use thereof, especially as a system of gearing or of ordinary belts and band-pulleys might answer the purpose in this respect; also, I do not wish to be limited to the use of the toothed interlocking hubs for connecting the motive power to the trip-bearing mechanism, since not only is this a very common expedient suggested by ordinary mechanical skill, but there are other well-known ways of accomplishing the result aimed at in this particular instance, as by pulleys and shifting belts, friction-clutches, spline and pocket, &c.

I claim as of my invention—

1. In a hat-hardening machine, two rolls journaled side by side, the bearings of one roll being fixed and the bearings of the other being vibratory, whereby during the revolution of the rolls against the hat the latter is subjected to a series of compressions, substantially as set forth.

2. In a hat-hardening machine, a hardening-roll journaled in stationary bearings, in combination with a similar roll journaled in horizontal juxtaposition to the first-named roll and adapted to be vibrated toward and from the latter, substantially as specified.

3. In a hat-hardening machine, two hardening-rolls arranged in horizontal juxtaposition, one of said rolls being adapted to revolve within fixed and stationary bearings, the other roll being journaled within a vibratory frame, whereby the hat is subjected to two operations—namely, revolution and periodical compression—substantially as set forth.

4. In a hat-hardening machine, a stationary roll, in combination with a movable roll adapted to have a slight reciprocatory movement during the operation on the hat-roll, substantially as set forth.

5. In a hat-hardening machine, the stationary roll journaled in the frame of the machine, in combination with the movable roll journaled at the top of a pivoted and swinging frame, a jog-frame pivoted concentric with the pivotal point of the swinging frame, a short shaft having bearings within the jog-frame, and a compound eccentric secured on said shaft and adapted to act against the swinging frame, substantially as set forth.

6. In combination with the swinging and jog frames, a shaft extending through the jog-frame and having mounted thereon a compound eccentric, a strap around said eccentric, a strap connected to the swinging frame, a screw-bolt connecting said straps, and a sprocket-wheel mounted on said shaft and belted to the primary motive power, substantially as and for the purpose set forth.

7. In combination with the swinging and jog frames connected together, as described, a lever pivoted to the jog-frame and extending loosely through a bearing in the machine-frame, and a trip-bar pivoted to said lever and adapted to drop by gravity into locking abutment with the machine-frame, substantially as set forth.

8. In a hat-hardening machine, the combination, with the rolls and the means for operating the same against the hat-roll, of tripping mechanism consisting of a chain carried by wheels independent of the motive power, a trip-pin adjustably attached to said chain, a trip-bar which locks the hardening-rolls in operative position, and means for interlocking said tripping mechanism with the motive power, whereby said pin is forced by the travel of the chain against the trip-bar, thereby allowing the separation of the rolls, substantially as set forth.

9. In combination with the trip-bearing chain carried by wheels independent of the motive power and mechanism for connecting said wheels and power, means, as a weight and rope, adapted by gravity to revolve said wheels in a reverse direction, and thereby restore the trip-pin to its normal position, substantially as set forth.

10. In a machine, as described, a sprocket-wheel having a clutch formed with its hub adapted to engage with a similar clutch carried by the motive power, in combination with means, as a weighted striker and a yoke operated thereby, for engaging said clutches, the striker adapted to be restored to its normal position by the swinging movement of the jog-frame, whereby the yoke is operated to disengage the clutch and motive power, thereby allowing the jog-frame and trip-bearing chain to return to their normal positions, substantially as set forth.

11. The sprocket-wheels carrying the tripper and mounted on shafts independent of the motive power, said wheels arranged one above the other, the upper wheel mounted on fixed bearings and having rigidly secured thereto a drum around which is coiled a rope with a weight at the free end, and the lower wheel secured on a hub which has a sidewise play on its shaft, in combination with a sprocket-wheel mounted on fixed bearings on the lower shaft, the hub of said sprocket adapted to be interlocked with the hub of the adjacent trip-carrying wheel, the primary motive power connected to said sprocket, and means for engaging and disengaging said hubs at predetermined times, whereby the operation of the tripping mechanism is determined, substantially as set forth.

12. In combination with the sprocket-wheels carrying the tripper and mounted on shafts, as described, the yoke pivoted to the machine-frame and attached at one end to the loose hub of the lower of said wheels, the primary shaft, a sprocket mounted on the same shaft with the lower trip-bearing sprocket and adapted to be engaged with the loose hub of the latter, and means for forcing said yoke to one side, whereby said loose hub is interlocked with that of the adjacent sprocket, substantially as set forth.

13. In combination with the trip-bearing sprocket-wheel mounted loosely on its shaft and the pivoted yoke attached to the hub of said wheel and adapted to be forced to one side, whereby the latter is engaged with the motive power, means dependent upon the jog-frame for automatically restoring said yoke to its normal position, whereby the tripping mechanism is disengaged from the motive power, substantially as set forth and specified.

In testimony whereof I affix my signature in presence of two witnesses.

SEYMOUR C. PALMER.

Witnesses:
S. H. HUBBARD,
T. W. SMITH, Jr.